United States Patent

Carmouche

[15] 3,638,616
[45] Feb. 1, 1972

[54] FISH-GROWING AQUARIUM

[72] Inventor: William Jeter Carmouche, 353 Stanford Ave., Baton Rouge, La. 70808

[22] Filed: Sept. 14, 1970

[21] Appl. No.: 71,762

[52] U.S. Cl. ....................................................119/5, 119/3
[51] Int. Cl. ..........................................................A01k 63/00
[58] Field of Search ................................................119/2, 3, 5

[56] References Cited

UNITED STATES PATENTS

| | | | |
|---|---|---|---|
| 893,625 | 7/1908 | Heuscher et al. | 119/5 |
| 3,418,973 | 12/1968 | Saito | 119/3 |
| 3,565,043 | 2/1971 | Carmouche | 119/3 |

Primary Examiner—Aldrich F. Medbery

[57] ABSTRACT

An aquarium with fresh water supply above for growing large quantities of fish in a minimum of space. A screen across aquarium confines fish to upper levels and prevents them from mixing descending waste particles below with fresher water above. Slanted bottom of aquarium converges to an adjustable outlet through which sediments are forced by the weight of water above. An air pump releases bubbles at end of tubing near screen to aerate water and create circulation causing contaminants to fall by gravitational and centrifugal forces. A ball valve with float closes outlet when water level falls too low. A siphon and auxiliary tank prevents overflow. Fresh water entering presses water with contaminants away from fish through screen below and out of discharge opening, removing pollutants and replacing water at required intervals to permit the crowded fish to grow for years. A filter retards the return of the heavier particles of pollutants and nitrogenous substances to the space occupied by the fish. A small propeller aerator strengthens the circulation.

1 Claims, 1 Drawing Figure

PATENTED FEB 1 1972 3,638,616

INVENTOR:
William J. Carmouche 3,638,616

FISH-GROWING AQUARIUM

This application is an improvement of application Ser. No. 829,667 filed June 2, 1969—now U.S. Pat. No. 3,565,043. The original application covered a more complex aquarium incorporating the significant features of the aquarium described in this application, but failed to formally describe the more practical adaptation as described below.

DISTINCTION BETWEEN THIS INVENTION AND PREVIOUS ART

Previously aquariums and tanks have been developed in the fish-producing industry primarily for the purpose of holding alive harvested fish for limited periods of time pending sale. Fry fish and small fingerlings could be held in such troughs for longer periods because of their smaller size. Contamination was less extensive. Accordingly the fingerlings could even be fed and grown for a few months provided the water supply was enormous and the fingerlings were not crowded. Even under these undesirable conditions pollutants accumulated in those inadequate devices and the fingerlings could survive for only a limited period. The concept of raising great numbers of fish in small spaces from fry or fingerlings to fully gown size was not generally recognized as feasible. The standard troughs and drums with the bottom drain standpipe surrounded by a ventura sleeve served the fish farmers well in the past in achieving the limited objectives for holding fish temporarily in a convenient location pending sale while persevering in the operation of expensive ponds and lakes which enabled them to produce only 2,000 fish per acre. There was no impetus to improve the fundamental structure of their holding troughs while pursuing the conventional method of producing fish in ponds. The only merits of the standard aquarium or drum with the bottom drain standpipe were their ability to maintain a constant level of water and sustain relatively few fish in discomfort for a short period of time. They performed this function satisfactorily in the past because these were the only recognizable purposes then. There was no known incentive for improvement at that time.

This standard type trough or drum could never serve the purpose of growing from small fry to maturity as many as 2,000 fish in the space of 4 cubic yards. It has recently been demonstrated that this can be done. The regular devices in operation could not perform this feat because of inherent limitating.

In these regular devices the waste matter and contaminants are constantly mixed with the fresh water entering, keeping the water polluted as the fish swim in all directions. There is no arrangement to keep the fish separated from the heavier pollutants which would normally settle to the bottom if not agitated by the moving fish. No serious attempt was made to utilize the slanted bottom which causes the sediment to converge into an outlet because this would be of little benefit since the waste material is constantly churned by the motion of the fish. In the conventional holding troughs, it is extremely difficult to remove the pollutants which manage to accumulate along the relatively flat bottom.

Aerators and mechanical agitators fail to create a circulation of water which is conducive to the settlement and removal of heavier particles of waste matter.

Of prime importance is the failure of the bottom drain standpipe to lift waste matter from the bottom effectively, even if it were not mixed. The principles utilized in these troughs are in conflict with objective of removing pollutants effectively. The flow of dirty water between the standpipe and the ventura sleeve is in a direction which is opposite to the direction of the force of gravity acting on the sediment. This reduces the efficiency of the lift. The only force available to produce the flow out of the standpipe is the slight weight of the water represented by the difference between the level of the water in the regular troughs and the height of the standpipe, created by the supply of fresh water. The fresh water entering the trough causes the water level to rise slightly above top of standpipe. This small rise produced constitutes the only force available to lift and remove the waste matter. This small force must not only overcome the downward force of gravity acting on the waste matter, but it must also cope with the viscosity or friction along the outer side of the standpipe and the inner side of the sleeve pipe. If the rate of flow of fresh water is increased the elevation of the water level is increased only slightly, because the increased supply is distributed along the entire surface of the water in the trough. The rate of flow out of the standpipe drain will also increase, but only slightly. With a standpipe of a given diameter a constant acceleration in the flow of fresh water into the trough would eventually exceed the capacity of the drainpipe to discharge all of the increase. As a consequence the water level would continually rise. In order to equalize the rate of discharge with the rate of supply the diameter of the standpipe would need to be enlarged. This would further reduce the force available for the removal of sediments. It is not feasible for the standard aquariums or holding troughs to successfully remove pollutants from an aquarium intended for the growing of a large number of fish within a small space.

The improvements described in this application correct these deficiencies and form the basic device for the growing of massive quantities of fish in relatively small aquariums.

It has been demonstrated recently at Auburn University and other research centers that 500 catfish can be grown within the confinements of a cage the size of 1 cubic meter. A maximum of four cages containing a total of about 2,000 could be placed in a 1-acre pond without distress to the fish. A larger number of cages of fish in 1 acre of pond would produce too much pollution.

It has also been experimentally demonstrated that catfish can grow and thrive for years if the water in which they are confined were effectively changed only 24 times a day.

OBJECTS OF INVENTION

The primary object of this invention is to provide an aquarium which will permit the growing of approximately 2,000,000 pounds of fish in 1 acre of aquariums, whereas it would require 1,000 acres of ponds to produce the same amount of fish, and the volume of water required by the ponds would be over 100 times as much as that required by the aquarium because a great amount of water is lost through evaporation, seepage and drainage for the reconditioning of the beds of the ponds.

The following is a summary of the specific and general objects:

To restrict the growing fish to the top level of the aquarium, by means of a screen, where the supply of fresh water falls into the aquarium and pushes the lower levels of soiled water downward away from the fish and through the outlet at bottom;

To make available the full weight of the entire volume of water above outlet of aquarium to force out the contaminating sediment;

To prevent accumulation and stagnation of sediment by providing a slanted converging bottom for the aquarium causing the sediment to slide toward the outlet;

To separate the fish fro the settling contaminants and waste matter descending to the lower levels of the water by the adaption of a screen beneath the fish across the aquarium;

To permit the heavier particles of contaminants to travel freely through the screen and to prevent the fish from mixing the sediment below with the fresh water above;

To generate a vertical circulation of the water by use of conventional air pump and aerator or propellor to aerate the fresher water above the screen, to facilitate the removal of carbon dioxide and to encourage the descent of contaminating particles by the centrifugal forces generated in the circulation produced;

To enable fish farmers to convert about 999 acres of fish ponds to other profitable operations with every acre of aquariums developed, and still produce the same quantity of fish with a tremendous economy in time, labor, materials, and equipment;

To eliminate the strenuous seining work in the harvesting of fish in ponds;

To reduce the effort expended in the distribution of feed over the wide areas in ponds;

To focus the air bubbles in the water where the fish are congregated so that the benefits of aeration are accessible to all the fish;

To reduce the amount of water required to about 1 percent of the amount needed for fish cultivated in ponds by eliminating the factors of evaporation, seepage and stagnation;

To utilize the water flowing through the outlet of the aquarium in the irrigation of agricultural crops produced on converted pond land;

To conveniently eradicate parasites and bacteria afflicting all the fish by application of treatment with appropriate chemicals within the small volume of water in the aquarium instead of distributing the chemicals in larger quantities through the vast body of water in the ponds;

To control the level of the water in the aquarium by use of a float operated ball valve and a siphon with an auxiliary tank to prevent water from falling below a certain level and from rising above a certain height;

To permit the quick flushing of the aquarium by simultaneously opening the water supply faucet and water outlet valve all the way at predetermined intervals to remove waste and chemicals and to maintain sanitary conditions of aquarium;

To promote the healthy growth of fish with a minimum investment;

To eliminate the cost of levy construction and the periodic draining of ponds to dry out and purify the beds;

To provide for convenient observation and treatment of the fish in the aquarium;

To provide a shallow submerged pan for feeding purposes when floating food pellets are not used, and To maintain a sanitary condition in volume of water inhabited by the fish.

DETAILED DESCRIPTION

Figure 1:
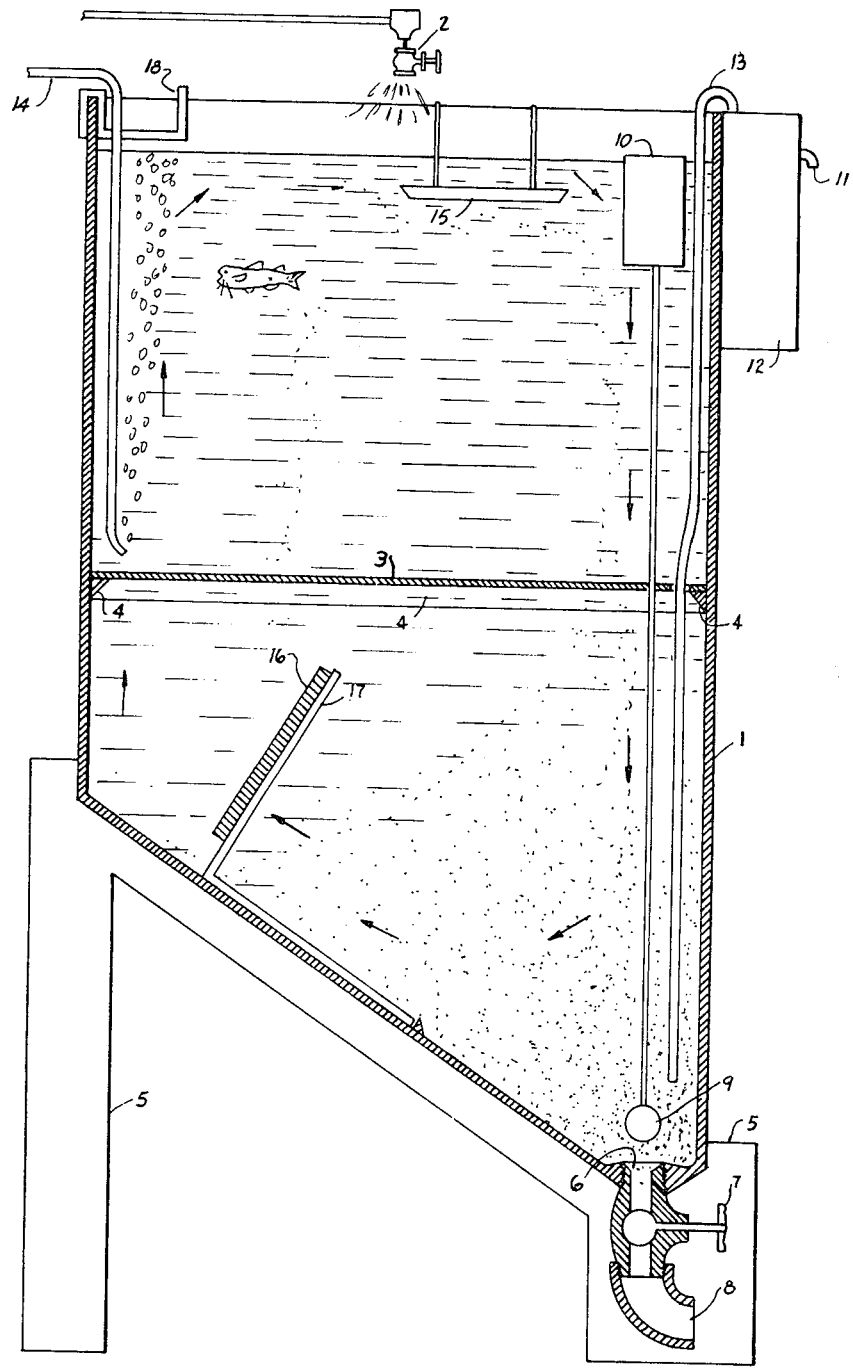
FIG. 1 is a vertical cross section showing the significant features of the fish-growing aquarium resting upon a support.

Referring to the drawing aquarium 1 is supplied with fresh water by spray from faucet 2. Screen 3 resting upon brackets 4 separate the fish in upper level of the fresher water from the dirtier water below. The screen permits waste matter and the heavier contaminating particles to descend through its meshwork and prevents the fish above from mixing the sediment with the fresher water. The aquarium is set upon supports 5. Discharge hole 6 is adjustable by operation of valve 7. Sediment of pollutants and waste matter is forced through first discharge hole 6 and out of second discharge outlet 8 by the weight of the volume of water above. Ball valve 9 closes discharge flow hole 6 by downward movement of float 10 when water level falls too low. The rate of flow from faucet 2 into aquarium should exceed slightly the rate of flow from aquarium through discharge opening 6. This is accomplished by appropriate adjustments to faucet 2 and valve 7. When the surface of the water in aquarium rises above height of outlet 11 of auxiliary tank 12, siphon 13 drains the excess water from the lower part of aquarium thus stabilizing the level of water. Air bubbles rising from tip of tubing 14 are supplied by a conventional air pump not shown. The movement of the bubbles generates a circulation, depicted by arrows, which encourages the settlement of all particles heavier than water by the downward centrifugal force exerted on the particles. The gravitational force acting on these particles influences them to remain at the lower levels. The distribution of the sediment is indicated by the dots shown in the drawing. Pan 15 is suspended from side of aquarium below the surface of the water to hold fishfood which does not float. Filter 16 attached to frame 17 which is supported on the bottom of aquarium minimizes the return of sediments and nitrogenous substances to the space occupied by the fish as the circulation of water proceeds. Brace 18 mounted on side holds a conventional aerator (not shown) to increase the aeration and circulation of water.

As fresh water enters at the top, the lower levels of dirtier water are forced downward through the screen and away from the fish as water laden with sediment flows through the outlet.

Conventional aerators (not shown) are attachable to the side of aquarium to increase circulation of water and to remove carbon dioxide and other toxic gases quicker.

A vertical strip (not shown) is suspended to a depth of several inches to isolate floating food pellets from the turbulence caused by operation of aerator.

I claim:

1. An aquarium device for the practical and economic growing of a massive quantity of fish in a minimum of space from fry or fingerlings to maturity, including a constantly running water supply therefor, with a slanted converging bottom to guide waste matter and other pollutants to an adjustable first discharge hole in the lower part of said aquarium, a screen supported across said aquarium on brackets along the side of aquarium to confine the fish to the higher levels and to prevent the fish from mixing the contaminant-laden water below with the fresher water above, an adjustable valve connected to first discharge flow hole to regulate the rate of discharge resulting from pressure of water above, a length of tubing extending down one side of aquarium to release air bubbles, pumped from a separate source, into the water occupied by the fish above the screen to aerate the water and to create circulation to aid in the deposit of contaminants, an upstanding intermediately located filter supported on the bottom of the aquarium to minimize the return of pollutants to upper levels, a shallow pan suspended from the top of one side of said aquarium beneath the surface of the water to hold food, a brace mounted on top of one side of said aquarium to hold a conventional aerator, a water level operated ball valve means to close said first adjustable discharge hole when water level in aquarium falls below a certain level, an auxiliary water tank attached to the side of the aquarium for control of water level in said aquarium having an overflow outlet and a siphon means connected thereto, said siphon means having an end remote from said auxiliary tank and in close proximity with the first discharge opening, and a second discharge outlet located adjacent to the first adjustable discharge flow hole.

* * * * *